Figure 1:
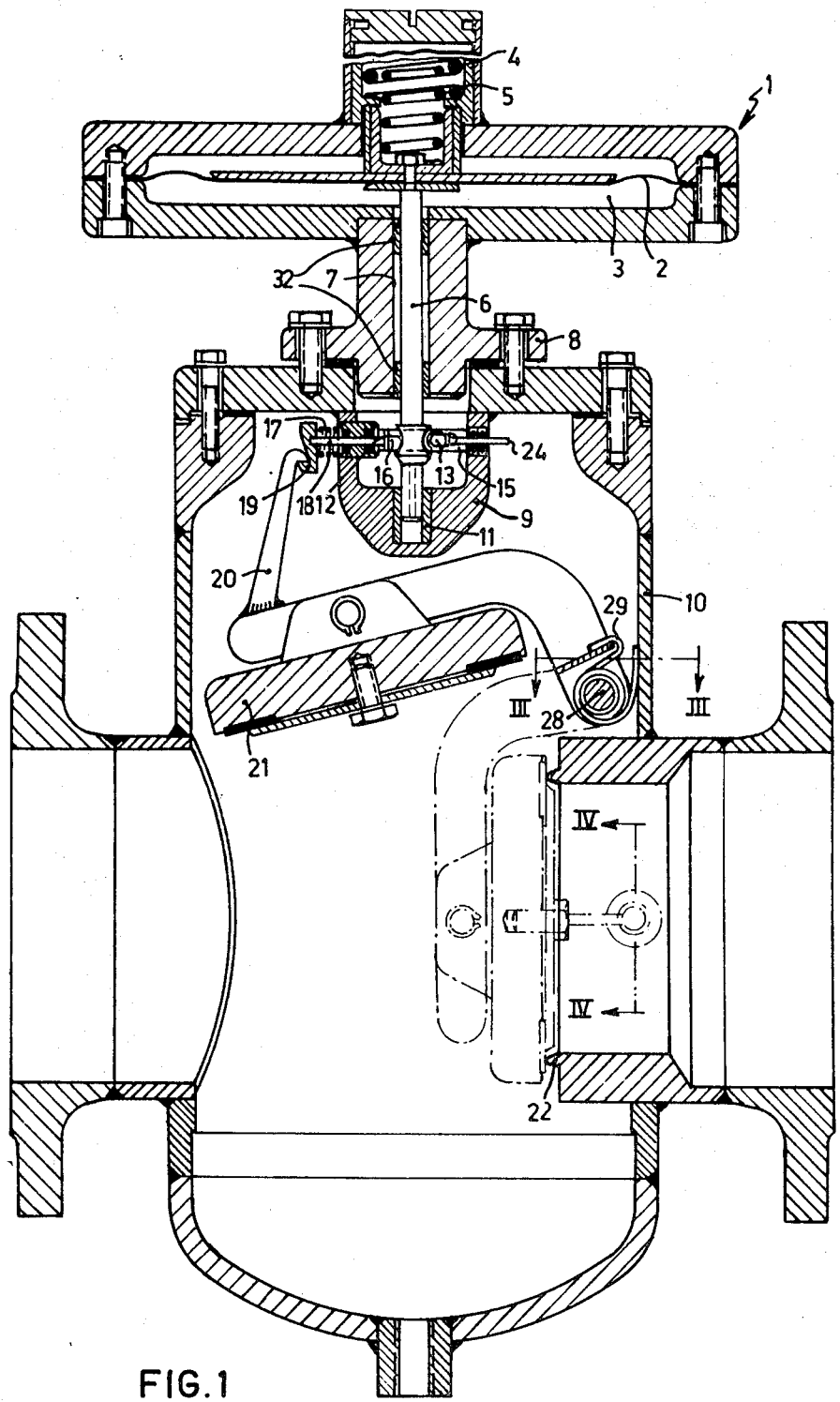

United States Patent

[11] 3,602,249

| [72] | Inventor | Jakob Zingg<br>Arau, Switzerland |
|---|---|---|
| [21] | Appl. No. | 818,352 |
| [22] | Filed | Apr. 22, 1969 |
| [45] | Patented | Aug. 31, 1971 |
| [73] | Assignee | Codetem, Compagnie Pour le Developpement de Techniques Modernes S. a. r. l.<br>Lausanne, Switzerland |
| [32] | Priority | Dec. 3, 1968 |
| [33] | | Switzerland |
| [31] | | 68/17299 |

[54] SAFETY VALVE
6 Claims, 4 Drawing Figs.

[52] U.S. Cl. .................................................. 137/377,
137/458, 137/463
[51] Int. Cl. ............................................... F16k 17/08
[50] Field of Search ........................................ 137/458,
461, 462, 463, 464, 377

[56] References Cited
UNITED STATES PATENTS

| 2,587,358 | 2/1952 | McRae | 137/463 |
| 2,694,408 | 11/1954 | MacRae | 137/463 X |
| 3,085,589 | 4/1963 | Sauds | 137/462 X |
| 3,169,546 | 2/1965 | Wenzl | 137/461 |

*Primary Examiner*—Harold W. Weakley
*Attorney*—Kurt Kelman

ABSTRACT: A safety valve intended for use between a supply source and a pressure regulator in a gas transmission system. The valve is "bidirectional," that is, it responds whenever the gas pressure exceeds a predetermined upper limit or falls below a predetermined lower limit. An important aspect of the invention is the fact that the operating mechanism for the valve is contained in a sealed chamber and the mechanism is, therefore, totally protected from potentially dangerous corrosion from the atmosphere and from the operating gas.

INVENTOR.
JACOB ZINGG

SAFETY VALVE

The invention relates to a gas safety valve for use between a supply source and a pressure control station, e.g. a pressure regulator, of a gaseous medium, the safety valve comprising an upper part, including a membrane which is loaded, on the one hand by the medium pressure between the safety valve and the pressure control station, primarily the outlet pressure of the regulator, and on the other hand by spring pressure said membrane being coupled to an operating mechanism which normally maintains the valve member in open position by means of a switch cam and, as soon as the latter medium pressure surpasses an adjusted maximum valve or falls below an adjusted minimum value, disconnects the switch cam under influence of a displacement of the membrane so that the valve member moves to its closed position and interrupts the flow of medium through the valve.

The invention comprises a safety valve in which the operating mechanism for the switch cam is exposed neither to the outer air nor to the flow of medium in the valve, on the one hand, and is located within an entirely closed construction, on the other hand.

Thus, the safety valve, according to the invention, is characterized in that the operating mechanism is mounted within the valve housing and within a chamber which is sealed in respect of the outer air and in respect of the medium flow passing through the valve. Thanks to this measure the operating mechanism is hidden from view and not exposed to objectionable chemical reaction, e.g. corrosion from the outer air and/or from the medium flow. The medium may be a gas or any other suitable medium.

A preferred embodiment of the safety valve is characterized in that the operating mechanism is in communication with the switch cam by means of a pin that has a passage imperious to the medium through the wall of the chamber, which cam is located in the medium space of the valve, and in that the upper part of the chamber is a removable upper flange which, after removal, gives access to the chamber. The sealing of the pin preferably consists of one or more O-ring seals.

According to a further characterizing feature the operating mechanism comprises a spindle which at its one end is directly connected to the membrane and, through a bore in the upper flange, extends into a guide sleeve in the lower wall of the chamber and, near its other end, is provided with a recess in its peripheral wall, said recess cooperating with a transverse pin which is slidably guided, in parallel with itself, in slots of a guide bracket which is attached to the chamber wall and the transverse pin is connected to a bracket arranged around the spindle, said latter bracket being under the action of a spring which draws the transverse pin into the recess and the latter bracket being stationarily connected to the pin extending through the chamber wall and carrying the switch cam, all this in such a manner that when the membrane moves the spindle upwards or downwards, the transverse pin is pressed laterally away from the recess, against the pressure of the spring, and the switch cam releases the valve member and this valve member interrupts the flow of medium through the valve.

Figure 2:
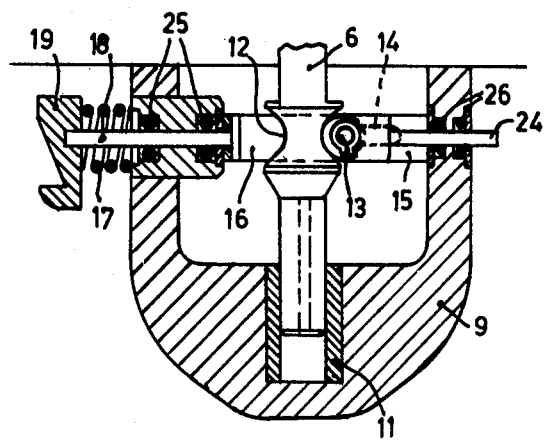
Figure 3:
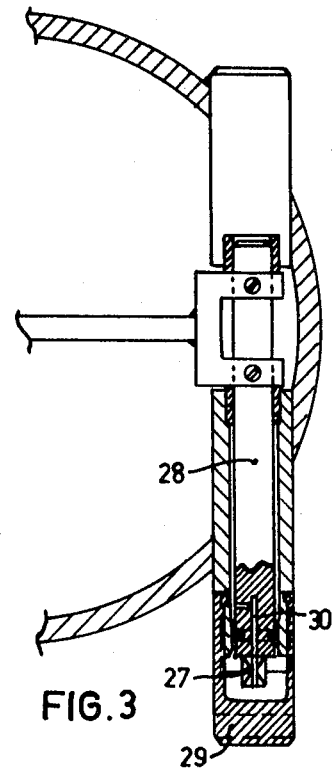
Figure 4:
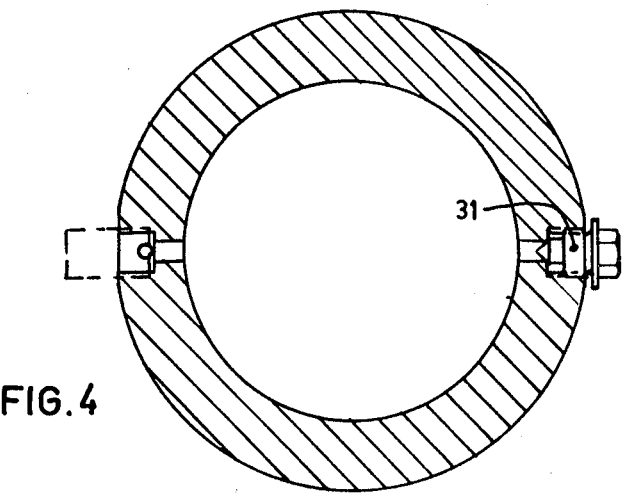

The operation of the invention will be more fully understood from the following detailed description and the drawing in which:

FIG. 1 is a longitudinal cross section of the valve;
FIG. 2 is a detail of the valve shown in FIG. 1;
FIG. 3 is a cross section on the line III—III in FIG. 2; and
FIG. 4 is a cross section on the line IV—IV of FIG. 1.
FIGS. 2-4 are drawn on a larger scale than FIG. 1.

The upper part 1 of the valve comprises a membrane 2. The space 3 below the membrane is connected to the pressure to be controlled. Mostly this is the outlet pressure of a regulator. At the upper side the membrane is loaded by an outer spring 4 for maximum cutout, pressure, and an inner spring 5 for minimum cutout pressure. If the pressure to be controlled becomes too high, the membrane moves upwards. If this pressure gets too low, the membrane moves downwards.

The upper end of a spindle 6 is coupled to the membrane, and the spindle is vertically slidable in a guide bore 7. This bore is located in an upper flange 8, sealing the chamber 9 at the top. The upper flange 8 is removably bolted onto the valve housing 10. The lower end of the spindle is guided into a sleeve 11 which is located in a blind bore in the lower wall of the chamber 9. At its lower end the spindle is provided with a recess 12 in its peripheral wall. This recess cooperates with a transverse pin 13 which is guided slidably in parallel with itself, in slots 14 (vide FIG. 2) of a guide bracket 15. Said bracket is attached to the chamber wall. The transverse pin 13 is connected to a bracket 16 situated around the spindle 6, said latter bracket being under the action of a pressure spring 17. Said spring draws the transverse pin 13 into the recess 12. The bracket 16 is stationarily connected to a pin 18 extending through the chamber wall and carrying the switch cam 19. When the membrane 2 moves the spindle 6 upwards or downwards, the transverse pin is pressed laterally away from the recess 12, against the pressure of the spring 17. As a result thereof the switch cam 19 releases the tumbler 20 and the valve member 21, The valve member then falls onto its seat 22, assisted by the spring 23, so that the medium flow in the valve housing is interrupted.

In the embodiment described, the operating mechanism is entirely hidden from view. It is accessible by removal of the upper flange 8. The medium flow does not need to be interrupted.

With operation pressures over 10 kg./cm.$^2$ the pin 18 and bracket 16 are relieved by a pin 24 which is attached to the right-hand side of the bracket 16 and extends into the pressure space of the valve. The pins 18 and 24 have the same diameters, smaller than the diameter of the spindle 6. The advantage of this measure is less friction.

Since the lower end of the spindle 6 does not extend through the lower wall of the chamber 9 and only O-ring seals 25 are provided around the pin 18, the influence of the medium pressure on the operating mechanism is infinitesimal. The use of pin 24 and O-ring seals 26 is very important since pressure variations in the housing no longer have any influence on operation of the valve.

The valve member 21 may be returned from its closed position (indicated by the dashed lines in FIG. 1) to the open position by means of a key which is located on the square 27 (FIG. 3) of the valve spindle 28 which extends outside the valve housing. Normally the square 27 is covered by a closing cap 29. Since the valve spindle 28 is bored through (vide 30 in FIG. 3), the sealing of the valve spindle is relieved during operation.

A balance (compensation) needle valve 31 is mounted in the wall of the valve housing (vide FIGS. 1 and 4), and, in the event valve member 21 is closed and the medium pressure in the housing exceeds 1 kg./cm.$^2$, the needle value equalizes the pressure.

Seals 32 seal the chamber 9 in respect of the space 3 of the upper part 1.

The invention is not restricted to the embodiment described and represented buy comprises all variants which are comprised by the rights claimed.

What is claimed is:

1. A gas safety valve for use between a supply source and a pressure regulator, of a gaseous medium, the safety valve comprising an upper part, including a membrane loaded, on the one hand, by the medium pressure between the safety valve and the pressure control station, primarily the outlet pressure of the regulator and, on the other hand, by spring pressure, said membrane being coupled to an operating mechanism which normally maintains the valve member in open position by means of a switch cam and, as soon as the medium pressure surpasses an adjusted maximum value or falls below a adjusted minimum value, disconnects the switch cam by displacement of the membrane, so that the valve member moves to its closed position and interrupts the flow of medium through the valve, the operating mechanism being mounted within a chamber positioned within the valve housing and which is sealed from the atmosphere and from the gas in the valve housing; said valve further comprising means for relieving a portion of said operating mechanism from the gas pressure within said valve housing, said portion carrying said switch cam outside said chamber and within the said valve housing.

2. A gas safety valve according to claim 1, wherein the operating mechanism is in communication with the switch cam by means of a pin that has a gastight passage through the wall of said chamber, said cam being located in the gas space of the valve; and the upper part of the chamber comprises a removable upper flange which, after removal, gives access to the chamber.

3. A gas safety valve according to claim 1, wherein the operating mechanism comprises a spindle which at one end is directly connected to the membrane and, through a bore in the upper flange, extends into a guide sleeve in the lower wall of the chamber and, near its other end, is provided with a recess in its peripheral wall, said recess cooperating with a transverse pin which is slidably guided, in parallel with itself, into slots of a guide bracket which is attached to the chamber wall, and the transverse pin is connected to a bracket arranged around the spindle, said latter bracket being under the action of a spring which draws the transverse pin into the recess, and the latter bracket being stationarily connected to a first pin extending through the chamber wall and carrying the switch cam, all this in such a manner that when the membrance moves the spindle upwards or downwards the transverse pin is pressed away from the recess, against the pressure of the spring, and the switch cam releases the valve member and said valve member interrupts the medium flow in the valve.

4. A gas safety valve according to claim 3, wherein said means for relieving comprises a second pin which is carried by said spring-loaded bracket and which, in opposite direction to the first pin, extends through a sealed bore in the chamber wall, said first and second pins having the same diameter, smaller than that of the spindle.

5. A gas safety valve according to claim 1, wherein a balance (compensation) needle valve is mounted in the wall of the valve housing which, in the event the valve member is closed and the medium pressure in the housing exceeds 1 kg./cm.$^2$, the needle valve equalizes the pressure therein.

6. A safety valve according to claim 1, wherein the valve spindle is hollow to relieve the valve spindle seal during operation.